(12) United States Patent
Hinterschuster

(10) Patent No.: US 6,772,808 B2
(45) Date of Patent: Aug. 10, 2004

(54) STORAGE AND DISPENSING RECEPTACLE

(76) Inventor: Stefan Hinterschuster, Skjutbanevägen 60, S-191 44 Sollentuna (SE)

( * ) Notice: Subject to any disclaimer, the term of this patent is extended or adjusted under 35 U.S.C. 154(b) by 0 days.

(21) Appl. No.: 10/197,025

(22) PCT Filed: Feb. 27, 2001

(86) PCT No.: PCT/SE01/00424
§ 371 (c)(1),
(2), (4) Date: Jul. 17, 2002

(87) PCT Pub. No.: WO01/64548
PCT Pub. Date: Sep. 7, 2001

(65) Prior Publication Data
US 2002/0190086 A1 Dec. 19, 2002

(30) Foreign Application Priority Data
Mar. 2, 2000 (SE) ................................. 0000708

(51) Int. Cl.[7] ............................................... B65B 1/00
(52) U.S. Cl. ....................................... 141/362; 141/360
(58) Field of Search .................................. 141/360, 362

(56) References Cited

U.S. PATENT DOCUMENTS

| | | | | | |
|---|---|---|---|---|---|
| 2,532,698 | A | * | 12/1950 | Corkins | 222/139 |
| 2,849,035 | A | * | 8/1958 | Morey | 141/360 |
| 2,857,940 | A | * | 10/1958 | Lane | 141/360 |
| 4,287,921 | A | * | 9/1981 | Sanford | 141/360 |
| 4,421,147 | A | * | 12/1983 | Cannella | 141/362 |
| 5,086,818 | A | * | 2/1992 | Bendt | 141/358 |
| 5,899,248 | A | * | 5/1999 | Anderson | 141/358 |
| 6,223,792 | B1 | * | 5/2001 | Slagle | 141/331 |

* cited by examiner

Primary Examiner—J. Casimer Jacyna
(74) Attorney, Agent, or Firm—Rolf Fasth; Fasth Law Offices

(57) ABSTRACT

Storage and dispensing receptacle comprising a receptacle part (1) and a dispensing part (2). The two parts (1, 2) are connectable with an openable closing device (3) for delivery of products stored in the receptacle part (1) to the dispensing part (2). The closing device (3) can be closed when the desired filling level has been reached and the metered product can be emptied out from the dispensing part (2).

2 Claims, 2 Drawing Sheets

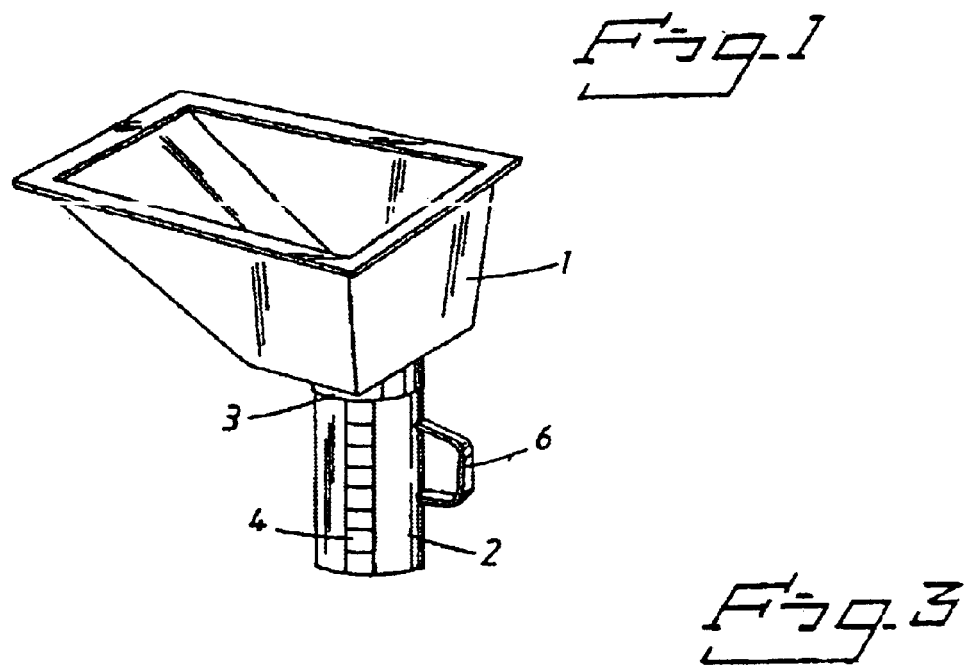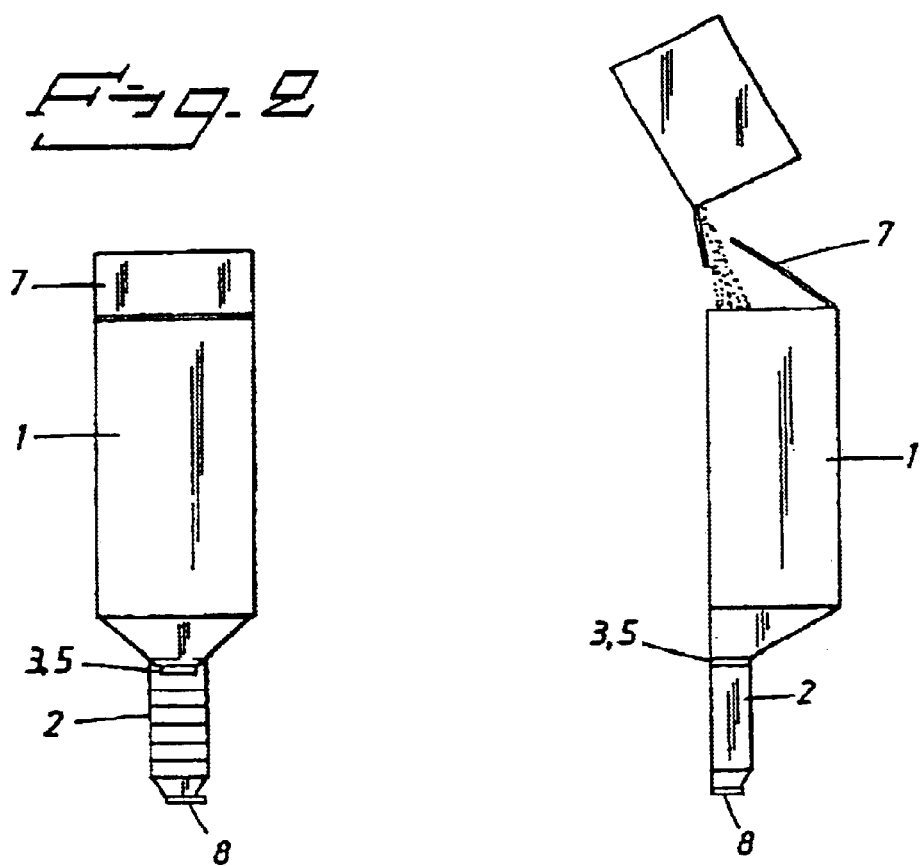

STORAGE AND DISPENSING RECEPTACLE

PRIOR APPLICATIONS

This is a US national phase application of International Patent Application No. FCT/SE01/00424, filed Feb. 27, 2001; which claims priority from Swedish Application No. 0000708-8, filed Mar. 2, 2000.

FIELD OF THE INVENTION

The present invention relates to a storage and dispensing receptacle comprising a receptacle part and a dispensing part.

BACKGROUND AND SUMMARY OF THE INVENTION

In connection with, e.g., food preparation, it is circumstantial to use various product packages which are kept in cupboards and which when required for use must be taken out and the content metered with the use from different measuring devices, such as deciliter-measuring cups, whereupon the content is transferred to, for example, a pan. The same problem arises, for example, in a garage where oil is stored which in measured quantities is poured down in a smaller container to be subsequently supplied to an engine.

The object of the present Invention is to ease the handling of products which are stored and must be measured before they are used.

That object is realized with a storage and dispensing receptacle comprising a receptacle part and which is a dispensing part and characterized in that the two parts can be interconnected via an openable closing device which, when open transfers products stored in the receptacle part to the dispensing part, the closing device being closable when the desired filling level has been reached, whereupon the amount of metered products can be emptied out of the dispensing part.

According to a first embodiment the dispensing part is removable and preferably provided with conveniently formed means or handles.

According to a second embodiment the dispensing part is provided with an openable a outlet device.

Preferably, at least a portion of the dispensing part is transparent and provided with a level scale.

The storage and dispensing receptacle according to the invention has the advantage that the product is stored in a receptacle and, when it is to be used, is transferred to and metered in a dispensing part whereupon the dispensing part together with the metered product is disconnected and the product is used as desired or the products fed out directly from the dispensing part, for example to a pan.

BRIEF DESCRIPTION OF THE DRAWINGS

The present invention will now be described for an exemplifying purpose and with a aid of embodiments and reference Lo the annexed drawings, in which FIG. 1 is a diagrammatic sketch showing a first embodiment of the storage and dispensing receptacle according to the present invention.

FIG. 2 is a diagrammatic front view showing a second embodiment of the storage and dispensing receptacle according to the present invention.

FIG. 3 is a diagrammatic lateral view showing the second embodiment of the storage and dispensing receptacle according to the present invention.

DETAILED DESCRIPTION

Figure 4:
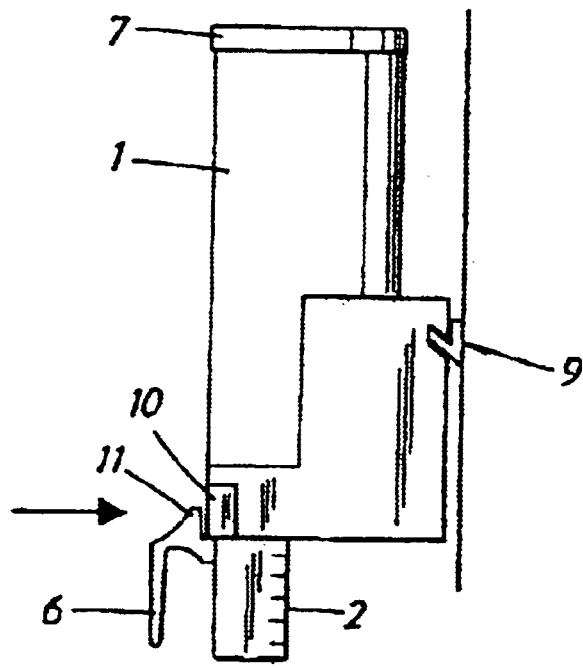
FIG. 4 is a lateral view showing a storage and dispensing receptacle according to the present invention mounted on a wall.

As appears from FIG. 1 the invention comprises a storage receptacle 1 and a dispensing part 2. Those are either interconnected, for instance by a bayonet joint or resilient means, or integrated and additionally show an openable closing device 3 between themselves. The dispensing part 2 is provided with a level-indicating device 4 and in the shown case the dispensing part 2 is transparent and provided with a level scale 4. Naturally, indication of the level can be done in other known ways or completely omitted.

The closing device 3 can by way of example be constituted by a retractable shutter as shown in FIG. 2 and 3 or operate like a shutter in a camera-objective when the device is rotated around its own axis, or according to some other known way.

In FIG. 1 a first embodiment of the present invention is shown wherein the dispensing part 2 can be disconnected from the receptacle 1 and the intermediate closing device 3 and is also provided with a handle 6. The dispensing part 2 can also include an outlet spout or the like (not shown). The handle 6 can be replaced by, for example, conveniently handling groove externally on the dispensing part 2. But, of course, the dispensing part 2 can be shaped in any arbitrary manner.

The storage and dispensing receptacle can by way of example be mounted retractable below a cupboard so that the receptacle 1 can be refilled when extracted, the cupboard serving as a lid when in pushed in position. The storage and dispensing receptacle can instead, if it is supported by a wall mounting 9, see FIG. 4, have an openable refill lid (not shown) in the top portion of the receptacle 1.

FIGS. 2 and 3 illustrate a second embodiment of the present invention which is better adapted for a wall mounting. The receptacle 1 has an openable lid 7 at its top portion or which is Covering the top of the receptacle 1. In this embodiment and dispensing part 2 is not removable (possibly so that it can be washed) but it is instead provided with an openable outlet device 8. This outlet device 8 can be identical with the closing device 3 or of any other known design.

The product in question is kept in the receptacle 1 and, when it is to be used, the closing device 3 is opened so that the product will be received in the dispensing part 2. When the desired amount of the product has been transferred to the dispensing part 2, the closing device 3 is again closed. According to the first embodiment the dispensing part 2 is then removed and taken to the place of use whereupon it is emptied. According to the other embodiment a pan or the like is placed below the dispensing part 2 whereupon the outlet device 8 is opened and kept opened until all of the product has left the dispensing part 2.

Figure 5:
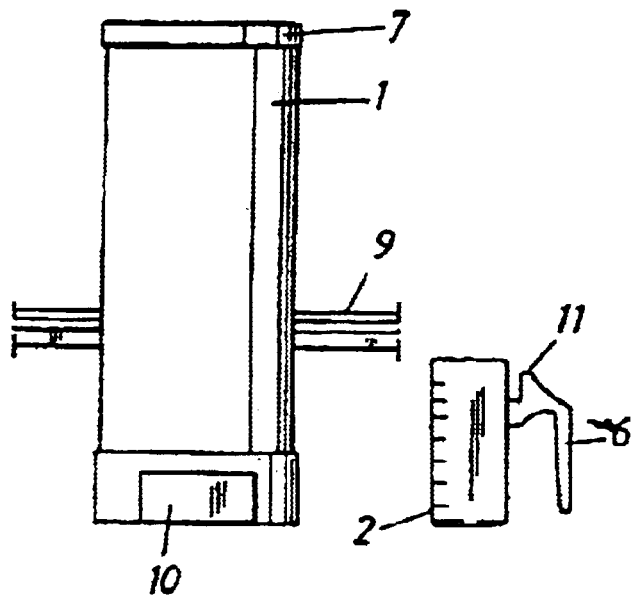
FIG. 5 illustrates the embodiment shown in FIG. 4 in a front view.

In FIGS. 4 and 5 another embodiment of a wall-mounted storage and dispensing receptacle is illustrated where a wall mounting 9 extends along the wall so that several receptacles can be mounted side by side. The dispensing part 2 can also be hung on the wall mounting when not in use. The dispensing part 2 is by way of example provided with not shown projections which can cooperate with grooves in the bottom of the receptacle 1. At the front edge of the bottom of receptacle 1 there is a spring biased control knob 10 which can be handled by of a projection 11 extending upwards from the handle 6 of the dispensing part 2. When the dispensing part 2 is pushed towards the wall the control knob 10 is pushed in by the projection 11 so that the receptacle portion 1 is opened permitting its content to pass down in to the dispensing part 2. When the pressure against the control knob 10 ceases, knob 10 returns to its initial position and the receptacle part 1 is closed.

The different receptacles 1 illustrated in the two embodiments can naturally in optional way be combined with the various dispensing parts shown.

A number of storage and dispensing- receptacles according to the invention can be combined to a system. By way of example, in a kitchen the different receptacles of the system can be filled with rice, macaroni, flour, cooking oil, dry fodder, coffee, müsli, etc.

As a suggestion the storage and dispensing receptacle can be manufactured in a hard plastic or in some metallic material.

The storage and dispensing receptacle according to the present invention can be controlled and/or driven mechanically or electrically/electronically meaning that a desired amount can be fed out manually and/or automatically on desired occasion. Accordingly, the storage and dispensing receptacle can be provided with such outlet devices which are, e.g., available on the market.

The invention is not restricted to the embodiments described above but also other modifications, not shown are conceivable, which are covered by the scope of the claims.

What is claimed is:

1. A storage and dispensing receptacle comprising a receptacle part (1) and a dispensing part (2), wherein the two parts are (1, 2) interconnectable with an openable closing device (3) which, for delivery of products stored in the receptacle part (1) to the dispensing part (2), the closing device (3) is closable when the desired filling level has been reached, whereupon the amount of metered products may be emptied out of the dispensing part (2), the dispensing part (2) being removably attached to and disposed below the closing device, the dispensing part being transparent and having a level scale (4) for indicating a level of products delivered from the receptable part through the closing device into the dispensing part, the dispensing part (2) having a handle (6) with a projection (11), the receptable part having an external control knob (10) disposed at a bottom thereof so that when the dispensing part (2) is attached to the bottom of the receptable part (1) the projection (11) engages the control knob (10) to open the closing device to permit the products contained in the receptable part to pass down into the dispensing part (2) and to close the closing device when the projection (11) is disengaged from the control knob (10).

2. A system including storage and dispensing receptacles, wherein a number of storage and dispensing receptacles according to claim 1 are combined in a unit.

* * * * *